(12) United States Patent
Chen

(10) Patent No.: US 9,351,115 B2
(45) Date of Patent: May 24, 2016

(54) METHOD AND APPARATUS FOR REMINDING USER BASED ON SET POSITION BY USING MOBILE TERMINAL

(71) Applicant: Huawei Device Co., Ltd., Shenzhen (CN)

(72) Inventor: Wei Chen, Wuhan (CN)

(73) Assignee: Huawei Device Co., Ltd., Shenzhen, Guangdong ( * ) Notice: Subject to any disclaimer, the term of this patent is extended or adjusted under 35 U.S.C. 154(b) by 0 days.

(21) Appl. No.: 14/455,428

(22) Filed: Aug. 8, 2014

(65) Prior Publication Data

US 2014/0349686 A1    Nov. 27, 2014

Related U.S. Application Data

(63) Continuation of application No. PCT/CN2013/072863, filed on Mar. 19, 2013.

(30) Foreign Application Priority Data

Mar. 19, 2012  (CN) .......................... 2012 1 0072800

(51) Int. Cl.
*H04W 24/00* (2009.01)
*H04W 4/02* (2009.01)
(Continued)

(52) U.S. Cl.
CPC ............ *H04W 4/021* (2013.01); *G08B 13/1427* (2013.01); *G08B 21/24* (2013.01);
(Continued)

(58) Field of Classification Search
CPC ....... H04W 4/021; H04W 4/023; H04W 4/02; H04W 64/00; H04W 84/12; H04M 1/72572; G08B 13/1427; G08B 21/24

USPC ............. 455/456.3, 456.1, 404.2, 414.2, 418, 455/550.1
See application file for complete search history.

(56) References Cited

U.S. PATENT DOCUMENTS

| | | | | |
|---|---|---|---|---|
| 7,528,713 B2 * | 5/2009 | Singh | .................... | G01S 5/0252 340/309.7 |
| 8,138,912 B2 * | 3/2012 | Singh | .................... | G01S 5/0252 340/309.7 |

(Continued)

FOREIGN PATENT DOCUMENTS

| CN | 2531464 Y | 1/2003 |
|---|---|---|
| CN | 1728601 A | 2/2006 |

(Continued)

OTHER PUBLICATIONS

Foreign Communication From a Counterpart, European Application No. 13764624.6, Extended European Search Report dated Nov. 10, 2014, 6 pages.

(Continued)

*Primary Examiner* — Khai M Nguyen
(74) *Attorney, Agent, or Firm* — Conley Rose, P.C.; Grant Rodolph; William H. Dietrich

(57) ABSTRACT

The present disclosure provides a method and an apparatus for reminding a user based on a set position by using a mobile terminal. The method mainly includes detecting, by a mobile terminal of a user by using a wireless network, that a distance between the mobile terminal and a set position is greater than a set value and reminding, by the mobile terminal, the user of a set event according to a set reminding manner. The present disclosure can make full use of a wireless local area network (WLAN) function or a wireless communication function of a mobile terminal to determine, without any additional hardware, a position of a user by using a WLAN or a positioning system, thereby implementing a function of reminding the user.

14 Claims, 1 Drawing Sheet

11 — A mobile terminal of a user detects by using a wireless network that a distance between the mobile terminal and a set position is greater than a set value 12 — The mobile terminal reminds the user of a set event according to a set reminding manner

(51) Int. Cl.
*H04M 1/725* (2006.01)
*G08B 13/14* (2006.01)
*G08B 21/24* (2006.01)
*H04W 64/00* (2009.01)
*H04W 84/12* (2009.01)

(52) U.S. Cl.
CPC .......... *H04M1/72572* (2013.01); *H04W 4/023* (2013.01); *H04W 4/02* (2013.01); *H04W 64/00* (2013.01); *H04W 84/12* (2013.01)

(56) References Cited

U.S. PATENT DOCUMENTS

| | | |
|---|---|---|
| 2004/0176107 A1 | 9/2004 | Chadha |
| 2009/0170532 A1* | 7/2009 | Lee et al. ................... 455/456.3 |
| 2010/0127919 A1 | 5/2010 | Curran et al. |
| 2010/0279710 A1 | 11/2010 | Dicke et al. |
| 2011/0117902 A1* | 5/2011 | Chang et al. .................. 455/418 |
| 2015/0230055 A1* | 8/2015 | Smith ................... H04W 64/00 455/456.3 |

FOREIGN PATENT DOCUMENTS

| | | |
|---|---|---|
| CN | 102202325 A | 9/2011 |
| CN | 102595322 A | 7/2012 |

OTHER PUBLICATIONS

Partial English Translation and Abstract of Chinese Patent Application No. CN2531464A, Oct. 14, 2014, 7 pages.
Partial English Translation and Abstract of Chinese Patent Application No. CN1728601, Oct. 14, 2014, 14 pages.
Partial English Translation and Abstract of Chinese Patent Application No. CN102202325A, Aug. 27, 2014, 4 pages.
Partial English Translation and Abstract of Chinese Patent Application No. CN102595322A, Aug. 27, 2014, 5 pages.
Foreign Communication From a Counterpart Application, PCT Application No. PCT/CN2013/072863, English Translation of International Search Report dated Jun. 27, 2013, 2 pages.
Foreign Communication From a Counterpart Application, PCT Application No. PCT/CN2013/072863, English Translation of Written Opinion dated Jun. 27, 2013, 6 pages.

* cited by examiner

METHOD AND APPARATUS FOR REMINDING USER BASED ON SET POSITION BY USING MOBILE TERMINAL

CROSS-REFERENCE TO RELATED APPLICATION

This application is a continuation of International Application No. PCT/CN2013/072863, filed on Mar. 19, 2013, which claims priority to Chinese Patent Application No. 201210072800.5, filed on Mar. 19, 2012, both of which are hereby incorporated by reference in their entireties.

TECHNICAL FIELD

The present disclosure relates to the field of communications technologies, and in particular, to a method and an apparatus for reminding a user based on a set position by using a mobile terminal.

BACKGROUND

A wireless local area network (WLAN) is a very convenient data transmission system. By utilizing a radio frequency (RF) technology to take the place of a local area network formed by an old-fashioned troublesome twisted pair copper wire, the wireless local area network can achieve, by using a simple access architecture, an ideal state where information is readily accessible to people traveling around the world.

At present, in addition to data communication using the WLAN, a WLAN-based positioning function is also developed, where positioning can be implemented by using the WLAN.

In the prior art, an apparatus for reminding a user of an article left behind includes a transmitter disposed on an article, a receiver, and a triggering switch disposed on a door, and a reminder, where an on or off state of the triggering switch is controlled by opening or closing of the door. The reminder is electrically connected to both the receiver and the triggering switch, and a working state of the reminder is controlled by an output state of the receiver and an on or off state of the triggering switch. When a user leaves with the article, the receiver receives a signal from the transmitter, and the reminder does not work. When the user leaves without the article, the receiver does not receive a signal from the transmitter, and the triggering switch triggers the reminder to send a reminding signal.

The foregoing apparatus in the prior art for reminding a user of an article left behind has the following disadvantages. A receiver needs to be installed on a door, and a user needs to carry a transmitter, which is troublesome for the user and is relatively costly.

SUMMARY

Embodiments of the present disclosure provide a method and an apparatus for reminding a user based on a set position by using a mobile terminal, so as to remind a user effectively.

A method for reminding a user based on a set position by using a mobile terminal includes detecting, by a mobile terminal of a user by using a wireless network, that a distance between the mobile terminal and a set position is greater than a set value and reminding, by the mobile terminal, the user of a set event according to a set reminding manner.

A mobile terminal includes a position detecting module configured to detect by using a wireless network that a distance between the mobile terminal and a set position is greater than a set value and a reminding processing module configured to remind a user of the mobile terminal of a set event according to a set reminding manner.

As can be seen from the foregoing technical solutions provided by the embodiments of the present disclosure, the embodiments of the present disclosure can make full use of a WLAN function or a wireless communication function of a mobile terminal to determine, without any additional hardware, a position of a user by using a WLAN or a positioning system, thereby implementing a function of reminding the user.

BRIEF DESCRIPTION OF DRAWINGS

To describe the technical solutions in the embodiments of the present disclosure more clearly, the following briefly introduces accompanying drawings required for describing the embodiments. The accompanying drawings in the following description show merely some embodiments of the present disclosure, and a person of ordinary skill in the art may still derive other drawings according to these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The embodiments to be described are a part rather than all of the embodiments of the present disclosure. All other embodiments obtained by a person of ordinary skill in the art based on the embodiments of the present disclosure without creative efforts shall fall within the protection scope of the present disclosure.

To facilitate the understanding of the embodiments of the present disclosure, further description is made by using several specific embodiments as examples with reference to the accompanying drawings, and each embodiment does not limit the embodiments of the present disclosure.

Embodiment 1

Figure 1:
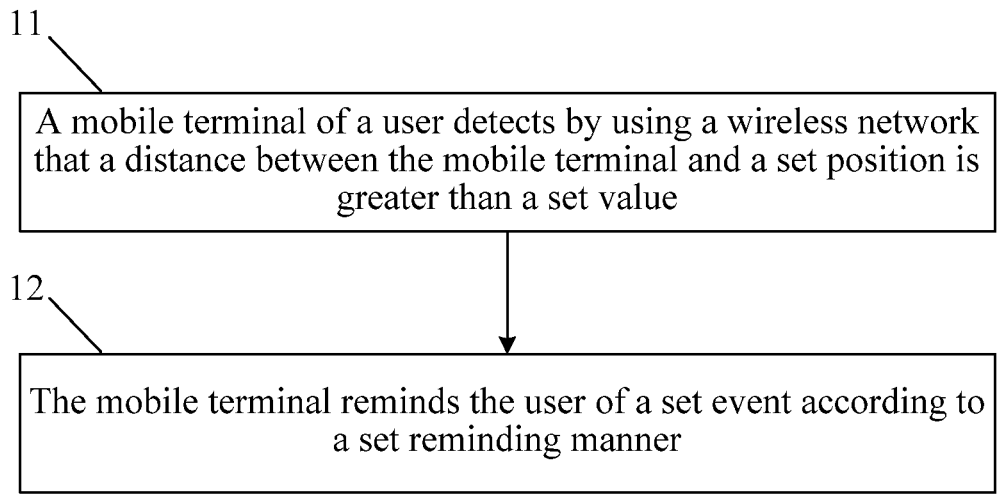
FIG. 1 is a flowchart of specific processing of a method for reminding a user based on a set position by using a mobile terminal according to Embodiment 1 of the present disclosure.

This embodiment provides a method for reminding a user based on a set position by using a mobile terminal. A specific processing procedure of this method is shown in FIG. 1, including the following processing steps.

Step 11: A mobile terminal of a user detects by using a wireless network that a distance between the mobile terminal and a set position is greater than a set value.

A wireless router is installed at the set position, where the set position may be a home address or an office address of the user. The mobile terminal may be a mobile phone of the user.

When the mobile terminal of the user is near the set position, the mobile terminal of the user may connect to the wireless router at the set position by using a WLAN. When the mobile terminal of the user detects by using the WLAN that the mobile terminal is disconnected from the wireless router at the set position, it is determined that the distance between the mobile terminal and the set position is greater than the set value.

In some embodiments, the mobile terminal of the user connects to a positioning system by using a wireless communication network, acquires a geographical position of the mobile terminal from the positioning system, and when a distance between the geographical position of the mobile terminal and a geographical position of the set position is greater than a set distance, determines that the distance between the mobile terminal and the set position is greater than the set value.

The positioning system includes the GPS (global positioning system, global positioning system) or the BeiDou Navigation Satellite System or a base station of the mobile terminal.

Step 12: The mobile terminal reminds the user of a set event according to a set reminding manner.

The mobile terminal rings or vibrates, and reminds the user of the set event on a display screen of the mobile terminal, for example, reminds the user to bring some articles.

As can be seen from the foregoing technical solution provided by the embodiment of the present disclosure, the embodiment of the present disclosure can make full use of a WLAN function or a wireless communication function of a mobile terminal to determine, without any additional hardware, a position of a user by using a WLAN or a positioning system, thereby implementing a function of reminding the user.

Embodiment 2

Figure 2:
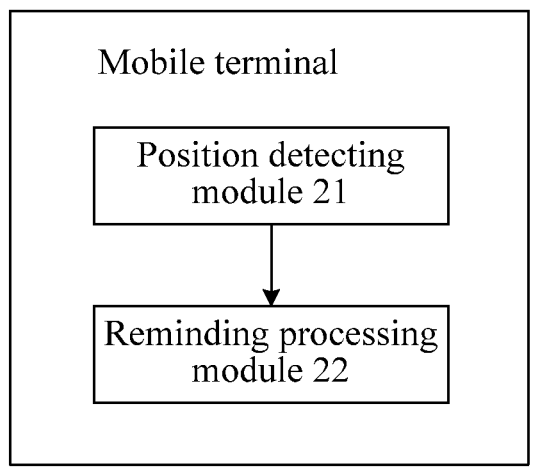
FIG. 2 is a structural diagram of an apparatus for reminding a user based on a set position by using a mobile terminal according to Embodiment 2 of the present disclosure.

This embodiment provides a mobile terminal. A specific structure of the mobile terminal is shown in FIG. 2 and includes the following modules: a position detecting module 21 configured to detect by using a wireless network that a distance between the mobile terminal and a set position is greater than a set value; and a reminding processing module 22 configured to remind a user of the mobile terminal of a set event according to a set reminding manner.

In some embodiments, the position detecting module 21 is further configured to after it is detected by using a wireless local area network that the mobile terminal is disconnected from a wireless router at the set position, determine that the distance between the mobile terminal and the set position is greater than the set value.

In some embodiments, the position detecting module 21 is further configured to connect to a positioning system by using a wireless communication network, acquire a geographical position of the mobile terminal from the positioning system, and when a distance between the geographical position of the mobile terminal and a geographical position of the set position is greater than a set distance, determine that the distance between the mobile terminal and the set position is greater than the set value.

In some embodiments, the positioning system includes the GPS or the BeiDou Navigation Satellite System or a base station of the mobile terminal.

In some embodiments, the reminding processing module 22 is further configured to perform a ringing or vibrating operation, and remind the user of the set event on a display screen of the mobile terminal.

A specific process of reminding a user based on a set position by using the apparatus of the embodiment of the present disclosure is similar to the foregoing method embodiment, which is not described repeatedly herein.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), a random access memory (RAM), or the like.

To sum up, the embodiments of the present disclosure can make full use of a WLAN function or a wireless communication function of a mobile terminal to determine, without any additional hardware, a position of a user by using a WLAN or a positioning system, thereby implementing a function of reminding the user.

The foregoing descriptions are merely exemplary and specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for reminding a user based on a set position by using a mobile terminal, comprising:
   detecting, by a mobile terminal of a user, that a distance between the mobile terminal and a set position is greater than a set distance value by using a wireless network; and
   reminding, by the mobile terminal, the user of a set event according to a set reminding manner.

2. The method according to claim 1, wherein the detecting, by a mobile terminal of a user by using a wireless network, that a distance between the mobile terminal and a set position is greater than a set distance value comprises determining that the distance between the mobile terminal and the set position is greater than the set distance value after the mobile terminal of the user has detected by using the wireless local area network that the mobile terminal is disconnected from a wireless router at the set position.

3. The method according to claim 1, wherein the detecting, by a mobile terminal of a user by using a wireless network, that a distance between the mobile terminal and a set position is greater than a set distance value comprises connecting, by the mobile terminal of the user, to a positioning system by using a wireless communication network, acquiring a geographical position of the mobile terminal from the positioning system, and when a distance between the geographical position of the mobile terminal and a geographical position of the set position is greater than a set distance, determining that the distance between the mobile terminal and the set position is greater than the set distance value.

4. The method according to claim 3, wherein the positioning system comprises a Global Positioning System (GPS).

5. The method according to claim 3, wherein the positioning system comprises a BeiDou Navigation Satellite System.

6. The method according to claim 3, wherein the positioning system comprises a base station of the mobile terminal.

7. The method according to claim 1, wherein the reminding, by the mobile terminal, the user of a set event according to a set reminding manner comprises ringing or vibrating, by the mobile terminal, and reminding the user of the set event on a display screen of the mobile terminal.

8. A mobile terminal, comprising:
- a position detecting module configured to detect by using a wireless network that a distance between the mobile terminal and a set position is greater than a set distance value; and
- a reminding processing module, configured to remind a user of the mobile terminal of a set event according to a set reminding manner.

9. The mobile terminal according to claim 8, wherein the position detecting module is further configured to, after it is detected by using a wireless local area network that the mobile terminal is disconnected from a wireless router at the set position, determine that the distance between the mobile terminal and the set position is greater than the set distance value.

10. The mobile terminal according to claim 8, wherein the position detecting module is further configured to connect to a positioning system by using a wireless communication network, acquire a geographical position of the mobile terminal from the positioning system, and when a distance between the geographical position of the mobile terminal and a geographical position of the set position is greater than a set distance, determine that the distance between the mobile terminal and the set position is greater than the set distance value.

11. The mobile terminal according to claim 10, wherein the positioning system comprises a Global Positioning System (GPS).

12. The mobile terminal according to claim 10, wherein the positioning system comprises a BeiDou Navigation Satellite System.

13. The mobile terminal according to claim 10, wherein the positioning system comprises a base station of the mobile terminal.

14. The mobile terminal according to claim 8, wherein the reminding processing module is further configured to perform a ringing or vibrating operation, and remind the user of the set event on a display screen of the mobile terminal.

* * * * *